United States Patent [19]

Zimmer

[11] Patent Number: 5,463,259

[45] Date of Patent: Oct. 31, 1995

[54] CONVERTER FOR GENERATING AN OUTPUT SIGNAL AS A FUNCTION OF THE POSITION OF A TRANSDUCER PART

[75] Inventor: Herbert Zimmer, Regensburg, Germany

[73] Assignee: Siemens Aktiengesellschaft, Munich, Germany

[21] Appl. No.: 30,814

[22] Filed: Mar. 12, 1993

[51] Int. Cl.[6] .................................................... G01B 7/14
[52] U.S. Cl. ..................................... 307/106; 324/207.18
[58] Field of Search ......................... 324/207.15, 207.18, 324/207.19; 340/870.01, 870.32; 123/476, 399; 307/106–110

[56] References Cited

U.S. PATENT DOCUMENTS 5,066,911  11/1991  Hulsing, II .......................... 324/207.18
5,210,490  5/1993  Munch et al. ....................... 324/207.17

Primary Examiner—Peter S. Wong
Assistant Examiner—Aditya Krishnan
Attorney, Agent, or Firm—Herbert L. Lerner; Laurence A. Greenberg

[57]  ABSTRACT

A converter includes a feed source furnishing a medium-frequency feed voltage of constant frequency and amplitude, a coupling element and a scanning head for producing an output signal as a function of a position of the coupling element relative to the scanning head. The scanning head includes a shell core of magnetic material having a middle leg and a cup-shaped jacket concentrically surrounding the middle leg, the cup-shaped jacket having an outer surface; a primary winding being wound around the outer surface of the jacket and connected to the feed source; and a secondary winding wound around the middle leg. The primary winding and the secondary winding are connected in opposite directions in series for supplying alternating voltages at the windings forming a differential voltage having a phase relationship relative to the feed voltage determining the output signal. A load having constant, accurately reproducible properties is coupled to the magnetic flux by means of the middle leg.

9 Claims, 2 Drawing Sheets

CONVERTER FOR GENERATING AN OUTPUT SIGNAL AS A FUNCTION OF THE POSITION OF A TRANSDUCER PART

The invention relates to a converter for producing an output signal as a function of the position of a coupling element relative to a scanning head, wherein the scanning head includes a shell core of magnetic material with a cup-shaped jacket which concentrically surrounds a middle leg, a primary winding which is wound on the outside around the jacket and is connected to a feed source which furnishes a medium-frequency feed voltage of constant frequency and amplitude, and a secondary winding which is wound around the middle leg; wherein the primary winding and the secondary winding are connected in opposite directions in series and the alternating voltages at these windings form a differential voltage having a phase relationship relative to the feed voltage which determines the output signal.

Such a converter is known from U.S. Pat. No. 4,121,112, and in combination with a toothed coupling element it serves to produce pulses at a defined interval from a reference pulse. At least one tooth of the coupling element includes a combination of materials having magnetic and electrical conductivity. That produces a differential voltage having a phase relationship relative to the feed voltage which depends on the aforementioned material properties and on the position of the coupling element relative to the scanning head. However, the only evaluation done is whether a tooth or a gap of the coupling element is located opposite the scanning head. Conversely, the known transducer is unable to furnish an output signal that is an accurate, reproducible measure for the position or spacing for the coupling elements relative to the scanning head.

It is accordingly an object of the invention to provide a converter for generating an output signal as a function of the position of a transducer part, which overcomes the hereinafore-mentioned disadvantages of the heretofore-known devices of this general type and which does so in such a way that its output signal is an accurate measure for the position of the coupling element relative to the scanning head. In particular, it must be assured that the converter curves (the output signal as a function of the position) of all of the converters of the same type are within a narrow, type-specific tolerance band, and more specifically this must be true for all operating temperatures and regardless of which production batch the material of the converters was taken from. It has been found that precisely this last requirement cannot be met if, as is known from the aforementioned U.S. patent, the coupling element is produced from a material having electrical and magnetic conductivity.

It is in fact impossible in practice to keep the properties of such materials, originating in different batches (production units), within adequately narrow limits.

With the foregoing and other objects in view there is provided, in accordance with the invention, a converter, comprising a feed source furnishing a medium-frequency feed voltage of constant frequency and amplitude; a coupling element; a scanning head for producing an output signal as a function of a position of the coupling element relative to the scanning head; the scanning head including a shell core of magnetic material having a middle leg and a cup-shaped jacket concentrically surrounding the middle leg, the cup-shaped jacket having an outer surface, a primary winding being wound around the outer surface of the jacket and connected to the feed source, and a secondary winding wound around the middle leg; the primary winding and the secondary winding being connected in opposite directions in series for supplying alternating voltages at the windings forming a differential voltage having a phase relationship relative to the feed voltage determining the output signal; and a load having constant, accurately reproducible properties and being coupled to the magnetic flux by means of the middle leg.

The invention is based on the discovery that the two functions that in the known case are associated with the electrical and magnetic conductivity of the coupling element can be separated from one another, and that materials having predominantly electrical or predominantly magnetic conductivity can be produced with the desired temperature response and with the necessary precision and long-term stability, even if they originate in different batches.

In particular, the coupling element includes a coupling part having a material with an electrical conductivity which is negligibly low in comparison with its magnetic conductivity, and having a spacing from the scanner head which determines the magnitude of the voltage at the secondary winding and therefore the phase relationship of the differential voltage and the magnitude of the output signal.

In contrast to the prior art, the phase displacement between the feed voltage and the voltage at the secondary winding, which is necessary for the functional principle of the converter, is shifted out of the coupling element into the scanner head. One option for achieving this is to place a short-circuit winding or an auxiliary winding, which supplies an ohmic resistor, around the middle leg. However, at the relatively high feed source frequency of 150 kHz in question, it is simplest and most effective to use a disk with good electrical conductivity and practically absent magnetic conductivity as the load.

Therefore, in accordance with another feature of the invention, the load is a disk having accurately reproducible material properties. In accordance with a further feature of the invention, the disk has a thickness being less than a penetration depth. In accordance with an added feature of the invention, the jacket and the middle leg have free ends, and the disk is disposed on the free ends.

Through the mechanical dimensions of this disk and its accurately reproducible electrical conductivity, the resultant phase displacement between the alternating voltages at the winding can be kept in narrow limits. On the other hand, the coupling flux through the middle leg can pass through the disk and thus be varied by the coupling element. This variation is based on a change in the total magnetic resistance of the coupling element and of the air gap between it and the scanning head, upon a variation of the position of the coupling element relative to the scanning head. This modulation of the coupling flux between the primary and second windings can be achieved not only with the aid of a coupling part including a magnetically conductive material (reducing the resistance), but also with the aid of at least one decoupling part including a magnetically nonconductive material (increasing the magnetic resistance).

In accordance with an additional feature of the invention, the scanning head has a center axis; the coupling element includes at least one coupling part of a material having a magnetic conductivity being high in comparison with its electrical conductivity, and at least one decoupling part having an electrical conductivity being high in comparison with its magnetic conductivity; the coupling and decoupling parts having a disk-like or plate-like form; the coupling and decoupling parts extending over a given length parallel to a cross-sectional plane through the center axis of the scanning head, the given length of the at least one decoupling part being great in comparison with the penetration depth; and the coupling and decoupling parts having end surfaces being disposed opposite the middle leg and being spaced apart from the middle leg by a distance depending on the position of the coupling part relative to the scanning head.

Advantageously, the coupling element includes a combination of at least one coupling part and one decoupling part, with the distances or spacing between these parts and the middle leg of the shell core varying as a function of the position of the coupling element relative to the scanning head. The change in the output signal at a predetermined change in position between the scanning head and coupling element is especially major if the effectiveness of the coupling part and decoupling parts (that is, the distance between these parts and the middle leg) varies inversely relative to the position. In that case, in one terminal position there is an extremely low coupling flux, determined primarily by the decoupling parts, while in the other terminal position there is an extremely high coupling flux, determined essentially only by the high magnetic conductivity of the coupling part.

In accordance with yet another feature of the invention, the coupling element is rotatable about an axis extending transversely to the center axis through the middle leg of the scanning head.

In accordance with yet a further feature of the invention, the at least one decoupling part is two decoupling parts each being disposed on a respective side of the at least one coupling part, at least in the vicinity of a magnetic field emerging from the middle leg.

In accordance with yet an added feature of the invention, the decoupling parts are firmly joined to the at least one coupling part.

In accordance with yet an additional feature of the invention, the distance between the end surfaces of the coupling and decoupling parts facing toward the scanning head is a variable function of the position of the coupling element relative to the scanning head.

In accordance with a concomitant feature of the invention, there is provided a capacitor connected parallel to the series circuit of the primary and secondary windings, the capacitor having dimensions causing it to represent a short circuit for high-frequency noise voltage.

Other features which are considered as characteristic for the invention are set forth in the appended claims.

Although the invention is illustrated and described herein as embodied in a converter for generating an output signal as a function of the position of a transducer part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
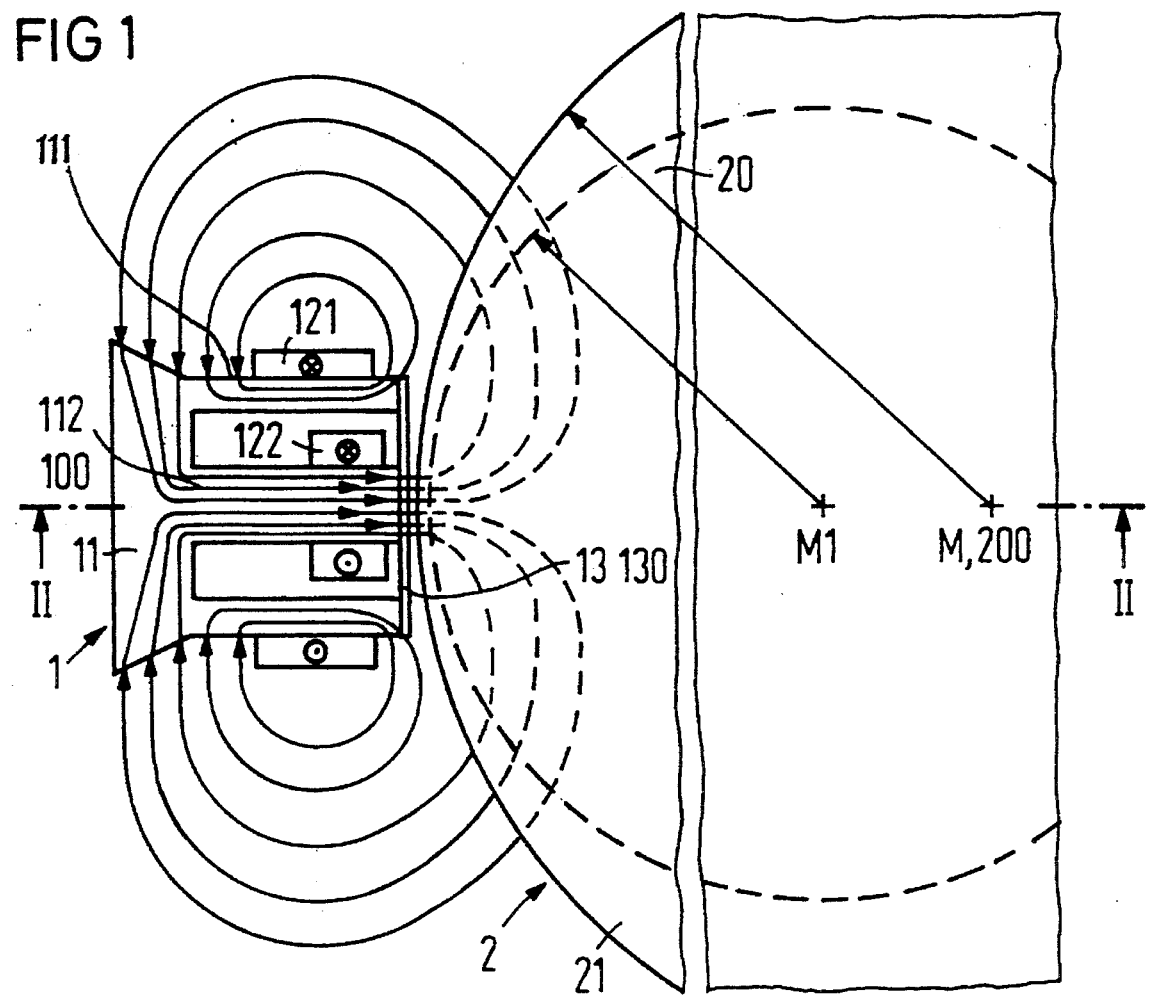
FIG. 1 is a sectional view of an exemplary embodiment of the invention, which is taken along the line I—I of FIG. 2, in the direction of the arrows.
Figure 2:
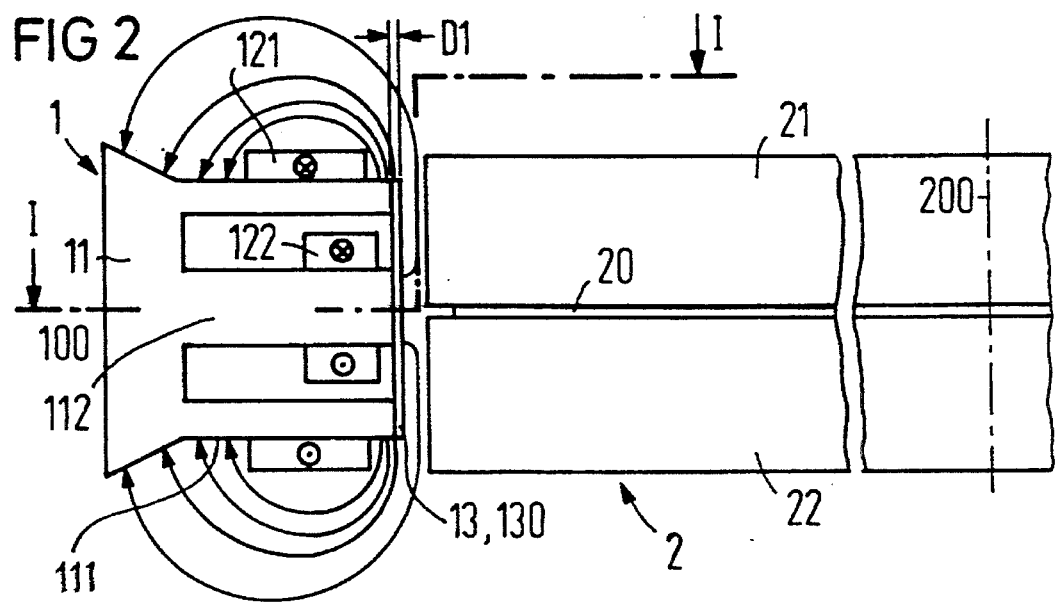
FIG. 2 is a sectional view of the exemplary embodiment of FIG. 1, which is taken along the line II—II of FIG. 1, in the direction of the arrows.

Referring now to the figures of the drawing in detail and first, particularly, to FIGS. 1 and 2 thereof, there is seen a scanning head 1 having a cup-shaped shell core 11 with a jacket 111, which is disposed coaxially around a middle leg 112 and a common center axis 100. The middle leg 112 has a secondary winding 122, and the jacket 111 has a primary winding 121.

The shell core 11 of ferrite material is covered by a disk 130, which rests on free end surfaces of the jacket 111 and the middle leg 112 and is thus secured, for instance, by firm clamping or adhesive bonding. This disk is formed of a material, such as sheet manganin, which is electrically conductive but has practically no magnetic permeability. The disk 130 has a thickness D1, such as 0.1 mm, which is selected to be less than the penetration depth at the frequency of the feed voltage (150 kHz). Accordingly, on one hand eddy currents are induced in the disk 130 and act as a load 13, but on the other hand the magnetic field lines originating at the middle leg can penetrate this disk.

A coupling element 2 includes a coupling part 20 made of a material (such as sheet ferrite or sheet transformer metal) having a magnetic conductivity which is very high in comparison with the electrical conductivity. This coupling part 20 is disposed between two decoupling parts 21, 22 made of a magnetically nonconductive and electrically conductive material (such as aluminum or copper). The length of these decoupling parts in the direction of the center axis 100 (parallel to the field lines from the middle leg) is great in comparison with the penetration depth, resulting in a high magnetic resistance for the coupling flux in this region. The total thickness of the coupling element 2 is slightly greater than the diameter of the scanning head 1.

By way of example, the coupling element 2 may be coupled to the gas pedal of a motor vehicle and is rotatable about an axis 200 which is disposed at right angles to the axis 100 of the scanning head. The decoupling parts 21, 22, at least in the rotation range being employed, have a circular contour with a center point M in the axis 200. The coupling part 20, in the rotation range being employed, also has a circular contour. In contrast, a center point M1 of its radius is offset relative to the axis 200, so that an air gap between the end surface of the coupling part 20 and the middle leg 112 increases steadily in size upon rotation of the coupling element 2 in the direction of an arrow in FIG. 1. Accordingly, the secondary voltage decreases with the rotary angle, and as a result the phase $\varphi$ between the resultant differential voltage and the feed voltage varies correspondingly. The course of the air gaps as a function of the rotary angle determines the course of the output signal: By simply varying the contour of the coupling part 20 and the decoupling parts 21, 22, practically any desired curve course can be attained.

Figure 3:
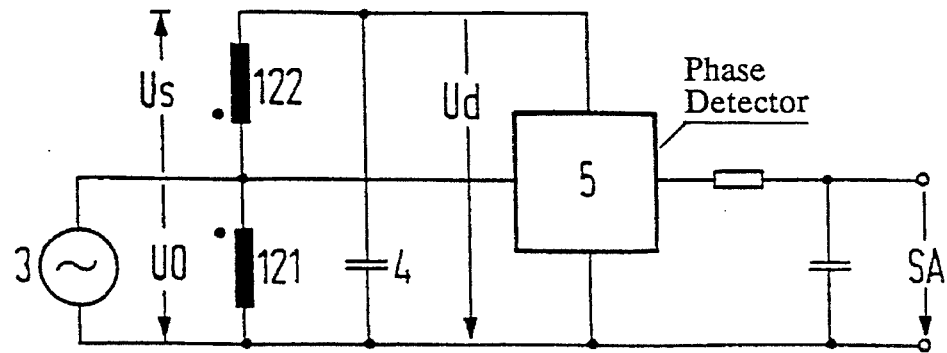
FIG. 3 is a schematic circuit diagram of an exemplary embodiment of the invention.

FIG. 3 shows the way in which the primary winding 121 and the secondary winding 122 are connected in series in opposite directions, and the way in which a feed voltage U0 on one hand and a differential voltage Ud between the feed voltage U0 and a secondary voltage Us at the secondary winding 122, are delivered to a phase detector 5. The series circuit of the primary winding 121 and the secondary winding 122 is connected parallel to a capacitor 4 and the primary winding 121 is connected parallel to a feed source 3. An output of this phase detector furnishes a signal of constant height, for instance, as long as Ud and U0 are simultaneously present. The resultant output voltage is then smoothed through an RC element and thus produces an output signal SA having a magnitude which is a measure for the phase difference and therefore for the rotary angle of the coupling part or transducer plate 20.

Figure 5:
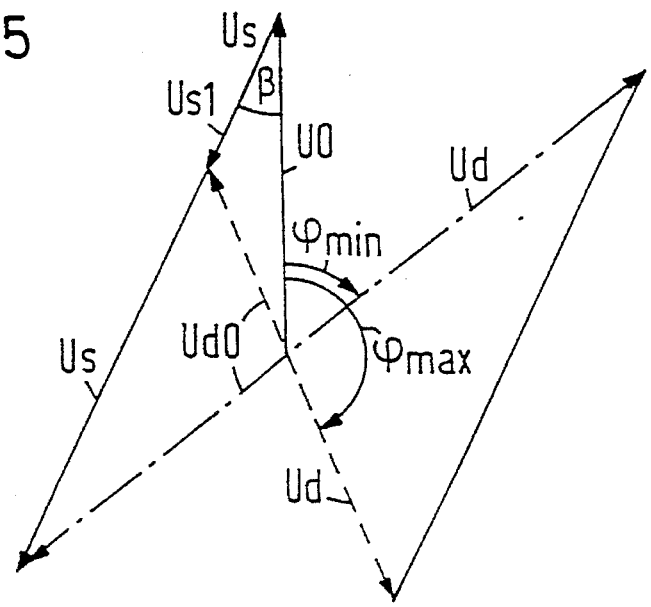
FIG. 5 is a vector diagram for the substitute circuit diagram of FIG. 4.

The vector diagram of FIG. 5 shows that the secondary voltage Us forms a constant angle β with the constant feed voltage U0. The size of this angle depends exclusively on the electrical conductivity and on the dimensions of the disk 130. Since very low tolerances in the conductivity and the dimensions must be adhered to, this phase angle β is virtually a constant.

Figure 4:
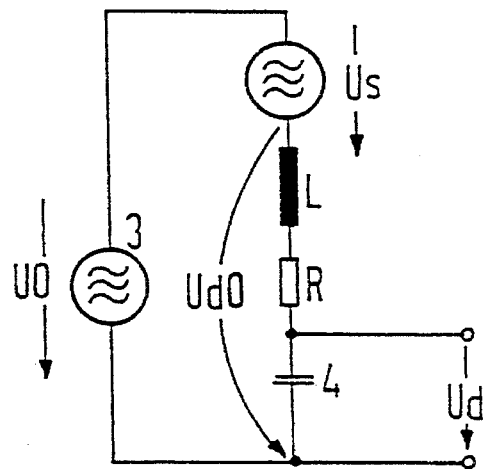
FIG. 4 is a simplified substitute circuit diagram for FIG. 3.

The magnitude of the secondary voltage Us is dependent on the spacing or distance between the coupling part 20 and the shell core 11 and between the decoupling parts 21, 22 and the shell core 11, and is variable between a minimum value Us1 at the maximum spacing for the coupling part 20 and the minimum spacing for the decoupling parts 21, 22 and a maximum value when the relationships are the reverse, but the angle b remains constant. With the position-dependent variation in the secondary voltage Us, the differential voltage Ud0 in idling, and therefore the phase angle between this differential voltage and the idling voltage U0, accordingly vary within a wide range. The same is true for the voltage at the capacitor 4 (vector Ud). The capacitor is preferably dimensioned in such a way that the resonant frequency including the capacitor 4 and the inductive interval resistance of a transducer L seen in FIG. 4 is at least 20% below the operating frequency (150 kHz). These components then form an inductive low-pass filter, which short-circuits high-frequency noise voltage.

FIG. 5 shows that the phase difference between the differential voltage Ud and the feed voltage U0 upon rotation of the coupling element 2 varies between a minimum value ξmin and a maximum value ξmax. This phase angle is accordingly a measure for the relative position between the coupling element 2 and the scanning head.

FIG. 5 shows that the magnitude of the secondary voltage Us is also a measure for the relative position between the scanning head and the coupling element. However, the evaluation of this amplitude is more vulnerable to interference than the evaluation of the phase difference.

In a departure from the example shown in FIGS. 1 and 2, the coupling element may also be guided in such a way that it executes a rectilinear motion transversely or parallel to the axis 100 of the scanning head 1. In the latter case, a constant air gap may also be used, and the magnetic resistance for the coupling flux may be varied as a function of the position by means of providing different cross sections for the coupling part and the decoupling parts.

I claim:

1. A converter, comprising:
   a feed source furnishing a medium-frequency feed voltage of constant frequency and amplitude;
   a coupling element;
   a scanning head for producing an output signal as a function of a position of said coupling element relative to said scanning head;
   said scanning head including:
      a shell core of magnetic material having a middle leg and a cup-shaped jacket concentrically surrounding said middle leg, said cup-shaped jacket having an outer surface;
      a primary winding being wound around said outer surface of said jacket and connected to said feed source; and
      a secondary winding wound around said middle leg;
      said primary winding and said secondary winding being connected in opposite directions in series for supplying alternating voltages at said windings forming a differential voltage having a phase relationship relative to the feed voltage determining the output signal; and
   a load in the form of a disk being electrically conducting and magnetically non-conducting, said disk being coupled to the magnetic flux by means of said middle leg.

2. The converter according to claim 1, wherein said disk has a thickness being less than a penetration depth.

3. The converter according to claim 2, wherein said jacket and said middle leg have free ends, and said disk is disposed on all said free ends.

4. The converter according to claim 1, wherein:
   said scanning head has a center axis;
   said coupling element includes:
      at least one coupling part consisting of a material having a magnetic conductivity being high in comparison with its electrical conductivity; and
      at least one decoupling part having an electrical conductivity being high in comparison with its magnetic conductivity;
      said coupling and decoupling parts having a disk-like or plate-like form;
      said coupling and decoupling parts extending over a given length parallel to a cross-sectional plane through the center axis of said scanning head, said given length of said at least one decoupling part being longer than the penetration depth; and
      said coupling and decoupling parts having end surfaces being disposed opposite said middle leg and being spaced apart from said middle leg by a distance depending on the position of said coupling part relative to said scanning head.

5. The converter according to claim 4, wherein said coupling element is rotatable about an axis extending transversely to the center axis through said middle leg of said scanning head.

6. The converter according to claim 5, wherein said at least one decoupling part is two decoupling parts each being disposed on a respective side of said at least one coupling part, at least in the vicinity of a magnetic field emerging from said middle leg.

7. The converter according to claim 6, wherein said decoupling parts are joined to said at least one coupling part.

8. The converter according to claim 7, wherein said distance between said end surfaces of said coupling and decoupling parts facing toward said scanning head is a variable function of the position of said coupling element relative to said scanning head.

9. The converter according to claim 1, including a capacitor connected parallel to said series circuit of said primary and secondary windings, said capacitor having dimensions causing it to represent a short circuit for high-frequency noise voltage.

* * * * *